US008667812B2

(12) United States Patent
Cuellar et al.

(10) Patent No.: US 8,667,812 B2
(45) Date of Patent: Mar. 11, 2014

(54) HYDROCABON GAS PROCESSING

(75) Inventors: Kyle T. Cuellar, Katy, TX (US); John D. Wilkinson, Midland, TX (US); Hank M. Hudson, Midland, TX (US)

(73) Assignee: Ordoff Engineers, Ltd., Midland, TX (US)

( * ) Notice: Subject to any disclaimer, the term of this patent is extended or adjusted under 35 U.S.C. 154(b) by 149 days.

(21) Appl. No.: 13/117,242

(22) Filed: May 27, 2011

(65) Prior Publication Data
US 2011/0296867 A1 Dec. 8, 2011

Related U.S. Application Data

(60) Provisional application No. 61/351,059, filed on Jun. 3, 2010.

(51) Int. Cl.
*F25J 3/02* (2006.01)

(52) U.S. Cl.
USPC ............... 62/621; 62/618; 62/619; 62/620; 62/623

(58) Field of Classification Search
USPC ............... 62/618–622, 625, 630–632, 929
See application file for complete search history.

(56) References Cited

U.S. PATENT DOCUMENTS

| 33,408 A | 10/1861 | Turner et al. |
|---|---|---|
| 2,952,984 A | 9/1960 | Marshall, Jr. |
| 3,292,380 A | 12/1966 | Bucklin |
| 3,675,435 A | 7/1972 | Jackson et al. |
| 3,837,172 A | 9/1974 | Markbreiter et al. |
| 3,983,711 A | 10/1976 | Solomon |
| 4,061,481 A | 12/1977 | Campbell et al. |

(Continued)

FOREIGN PATENT DOCUMENTS

| EP | 0 182 643 A2 | 5/1986 |
|---|---|---|
| EP | 1 114 808 A1 | 7/2001 |

(Continued)

OTHER PUBLICATIONS

B.C. Price et al., "LNG Production for Peak Shaving Operations", Proceedings of the Seventy-eighth Annual Convention of the Gas Processors Association, Nashville, Tennessee, Mar. 1-3, 1999, 8 sheets.

(Continued)

*Primary Examiner* — Allen Flanigan
*Assistant Examiner* — Johan Yavari
(74) *Attorney, Agent, or Firm* — Fitzpatrick, Cella, Harper & Scinto

(57) ABSTRACT

A process and an apparatus are disclosed for removing carbon dioxide from a hydrocarbon gas stream. The gas stream is cooled, expanded to intermediate pressure, and supplied to a fractionation tower at a top column feed position. The tower overhead vapor stream is compressed to higher pressure and cooled to partially condense it, forming a condensed stream. The condensed stream is expanded to intermediate pressure, used to subcool a portion of the tower bottom liquid product, then supplied to the tower at a mid-column feed position. The subcooled portion of the tower bottom liquid product is expanded to lower pressure and used to cool the compressed overhead vapor stream. The quantities and temperatures of the feeds to the fractionation tower are effective to maintain the overhead temperature of the fractionation tower at a temperature whereby the major portion of the carbon dioxide is recovered in the tower bottom liquid product.

6 Claims, 2 Drawing Sheets

(56) References Cited

U.S. PATENT DOCUMENTS

| | | | |
|---|---|---|---|
| 4,140,504 A | 2/1979 | Campbell et al. | |
| 4,157,904 A | 6/1979 | Campbell et al. | |
| 4,171,964 A | 10/1979 | Campbell et al. | |
| 4,185,978 A | 1/1980 | McGalliard et al. | |
| 4,251,249 A | 2/1981 | Gulsby | |
| 4,278,457 A | 7/1981 | Campbell et al. | |
| 4,284,423 A * | 8/1981 | Eakman et al. | 62/630 |
| 4,318,723 A | 3/1982 | Holmes et al. | |
| 4,322,225 A | 3/1982 | Bellinger et al. | |
| 4,445,917 A | 5/1984 | Chiu | |
| 4,519,824 A | 5/1985 | Huebel | |
| 4,525,185 A | 6/1985 | Newton | |
| 4,545,795 A | 10/1985 | Liu et al. | |
| 4,596,588 A | 6/1986 | Cook | |
| 4,600,421 A | 7/1986 | Kummann | |
| 4,617,039 A | 10/1986 | Buck | |
| 4,657,571 A | 4/1987 | Gazzi | |
| 4,687,499 A | 8/1987 | Aghili | |
| 4,689,063 A | 8/1987 | Paradowski et al. | |
| 4,690,702 A | 9/1987 | Paradowski et al. | |
| 4,698,081 A | 10/1987 | Aghili | |
| 4,705,549 A | 11/1987 | Sapper | |
| 4,707,170 A | 11/1987 | Ayres et al. | |
| 4,710,214 A | 12/1987 | Sharma et al. | |
| 4,755,200 A | 7/1988 | Liu et al. | |
| 4,851,020 A | 7/1989 | Montgomery, IV | |
| 4,854,955 A | 8/1989 | Campbell et al. | |
| 4,869,740 A | 9/1989 | Campbell et al. | |
| 4,889,545 A | 12/1989 | Campbell et al. | |
| 4,895,584 A | 1/1990 | Buck et al. | |
| 4,966,612 A | 10/1990 | Bauer | |
| 5,114,451 A | 5/1992 | Rambo et al. | |
| 5,275,005 A | 1/1994 | Campbell et al. | |
| 5,291,736 A | 3/1994 | Paradowski | |
| 5,335,504 A | 8/1994 | Durr et al. | |
| 5,363,655 A | 11/1994 | Kikkawa et al. | |
| 5,365,740 A | 11/1994 | Kikkawa et al. | |
| 5,555,748 A | 9/1996 | Campbell et al. | |
| 5,566,554 A | 10/1996 | Vijayaraghavan et al. | |
| 5,568,737 A | 10/1996 | Campbell et al. | |
| 5,600,969 A | 2/1997 | Low | |
| 5,615,561 A | 4/1997 | Houshmand et al. | |
| 5,651,269 A | 7/1997 | Prevost et al. | |
| 5,675,054 A | 10/1997 | Manley et al. | |
| 5,685,170 A | 11/1997 | Sorensen | |
| 5,755,114 A | 5/1998 | Foglietta | |
| 5,755,115 A | 5/1998 | Manley | |
| 5,771,712 A | 6/1998 | Campbell et al. | |
| 5,799,507 A | 9/1998 | Wilkinson et al. | |
| 5,881,569 A | 3/1999 | Campbell et al. | |
| 5,890,377 A | 4/1999 | Foglietta | |
| 5,890,378 A | 4/1999 | Rambo et al. | |
| 5,893,274 A | 4/1999 | Nagelvoort et al. | |
| 5,983,664 A | 11/1999 | Campbell et al. | |
| 5,992,175 A | 11/1999 | Yao et al. | |
| 6,014,869 A | 1/2000 | Elion et al. | |
| 6,023,942 A | 2/2000 | Thomas et al. | |
| 6,053,007 A | 4/2000 | Victory et al. | |
| 6,062,041 A | 5/2000 | Kikkawa et al. | |
| 6,116,050 A | 9/2000 | Yao et al. | |
| 6,119,479 A | 9/2000 | Roberts et al. | |
| 6,125,653 A | 10/2000 | Shu et al. | |
| 6,182,469 B1 * | 2/2001 | Campbell et al. | 62/621 |
| 6,244,070 B1 | 6/2001 | Lee et al. | |
| 6,250,105 B1 | 6/2001 | Kimble | |
| 6,269,655 B1 | 8/2001 | Roberts et al. | |
| 6,272,882 B1 | 8/2001 | Hodges et al. | |
| 6,308,531 B1 | 10/2001 | Roberts et al. | |
| 6,324,867 B1 | 12/2001 | Fanning et al. | |
| 6,336,344 B1 | 1/2002 | O'Brien | |
| 6,347,532 B1 | 2/2002 | Agrawal et al. | |
| 6,361,582 B1 | 3/2002 | Pinnau et al. | |
| 6,363,744 B2 | 4/2002 | Finn et al. | |
| 6,367,286 B1 | 4/2002 | Price | |
| 6,453,698 B2 | 9/2002 | Jain et al. | |
| 6,516,631 B1 | 2/2003 | Trebble | |
| 6,526,777 B1 | 3/2003 | Campbell et al. | |
| 6,565,626 B1 | 5/2003 | Baker et al. | |
| 6,578,379 B2 | 6/2003 | Paradowski | |
| 6,604,380 B1 | 8/2003 | Reddick et al. | |
| 6,694,775 B1 | 2/2004 | Higginbotham et al. | |
| 6,712,880 B2 | 3/2004 | Foglietta et al. | |
| 6,742,358 B2 | 6/2004 | Wilkinson et al. | |
| 6,907,752 B2 | 6/2005 | Schroeder et al. | |
| 6,915,662 B2 | 7/2005 | Wilkinson et al. | |
| 6,941,771 B2 | 9/2005 | Reddick et al. | |
| 7,069,743 B2 | 7/2006 | Prim | |
| 7,155,931 B2 | 1/2007 | Wilkinson et al. | |
| 7,159,417 B2 | 1/2007 | Foglietta et al. | |
| 7,165,423 B2 | 1/2007 | Winningham | |
| 7,191,617 B2 | 3/2007 | Cuellar et al. | |
| 7,210,311 B2 | 5/2007 | Wilkinson et al. | |
| 7,216,507 B2 | 5/2007 | Cuellar et al. | |
| 7,219,513 B1 | 5/2007 | Mostafa | |
| 7,565,815 B2 | 7/2009 | Wilkinson et al. | |
| 7,666,251 B2 | 2/2010 | Shah et al. | |
| 2002/0166336 A1 | 11/2002 | Wilkinson et al. | |
| 2004/0079107 A1 | 4/2004 | Wilkinson et al. | |
| 2004/0172967 A1 | 9/2004 | Patel et al. | |
| 2005/0229634 A1 | 10/2005 | Huebel et al. | |
| 2005/0247078 A1 | 11/2005 | Wilkinson et al. | |
| 2005/0268649 A1 | 12/2005 | Wilkinson et al. | |
| 2006/0032269 A1 | 2/2006 | Cuellar et al. | |
| 2006/0086139 A1 | 4/2006 | Eaton et al. | |
| 2006/0283207 A1 | 12/2006 | Pitman et al. | |
| 2008/0000265 A1 * | 1/2008 | Cuellar et al. | 62/630 |
| 2008/0078205 A1 | 4/2008 | Cuellar et al. | |
| 2008/0190136 A1 | 8/2008 | Pitman et al. | |
| 2008/0271480 A1 | 11/2008 | Mak | |
| 2008/0282731 A1 | 11/2008 | Cuellar et al. | |
| 2009/0100862 A1 | 4/2009 | Wilkinson et al. | |
| 2009/0107175 A1 | 4/2009 | Patel et al. | |
| 2009/0282865 A1 | 11/2009 | Martinez et al. | |
| 2010/0236285 A1 | 9/2010 | Johnke et al. | |
| 2010/0251764 A1 | 10/2010 | Johnke et al. | |
| 2010/0275647 A1 | 11/2010 | Johnke et al. | |
| 2010/0287982 A1 | 11/2010 | Martinez et al. | |
| 2010/0287983 A1 | 11/2010 | Johnke et al. | |
| 2010/0326134 A1 | 12/2010 | Johnke et al. | |
| 2011/0067441 A1 | 3/2011 | Martinez et al. | |
| 2011/0067442 A1 | 3/2011 | Martinez et al. | |
| 2011/0067443 A1 | 3/2011 | Martinez et al. | |
| 2011/0226011 A1 | 9/2011 | Johnke et al. | |
| 2011/0226012 A1 | 9/2011 | Johnke et al. | |
| 2011/0226013 A1 | 9/2011 | Johnke et al. | |
| 2011/0226014 A1 | 9/2011 | Johnke et al. | |
| 2011/0232328 A1 | 9/2011 | Johnke et al. | |

FOREIGN PATENT DOCUMENTS

| | | |
|---|---|---|
| WO | 99/37962 A1 | 7/1999 |
| WO | 00/33006 A1 | 6/2000 |
| WO | 01/88447 A1 | 11/2001 |
| WO | 02/14763 A1 | 2/2002 |

OTHER PUBLICATIONS

Fig. 16-33, on p. 16-24 of the Engineering Data Book, Twelfth Edition, published by the Gas Processors Suppliers Association 2004.

Finn et al., "LNG Technology for Offshore and Mid-scale Plants", Proceedings of the Seventy-ninth Annual Convention of the Gas Processors Association, Atlanta, Georgia, Mar. 13-15, 2003, 23 sheets.

Kikkawa et al., "Optimize the Power System of Baseload LNG Plant", Proceedings of the Eightieth Annual Convention of the Gas Processors Association, San Antonio, Texas, Mar. 12-14, 2001, 23 sheets.

International Search Report issued in International Application No. PCT/US 06/18932 dated Sep. 26, 2007—1 page.

International Search Report issued in International Application No. PCT/US 07/76199 dated Mar. 3, 2008—1 page.

(56) References Cited

OTHER PUBLICATIONS

International Search Report issued in International Application No. PCT/US 11/38303 dated Sep. 2, 2011—2 pages.
International Search Report issued in International Application No. PCT/US2008/052154 dated Oct. 14, 2008—1 page.
International Search Report issued in International Application No. PCT/US2008/079984 dated Dec. 19, 2008—1 page.
International Search Report issued in International Application No. PCT/US2010/046953 dated Oct. 25, 2010—3 pages.
International Search Report issued in International Application No. PCT/US2010/046966 dated Oct. 15, 2010—1 page.
International Search Report issued in International Application No. PCT/US2010/046967 dated Oct. 20, 2010—2 pages.
International Search Report issued in International Application No. PCT/US2011/029409 dated May 17, 2011—2 pages.
Written Opinion issued in International Application No. PCT/US 06/18932 dated Sep. 26, 2007—7 pages.
Written Opinion issued in International Application No. PCT/US 07/76199 dated Mar. 3, 2008—28 pages.
Written Opinion issued in International Application No. PCT/US 11/38303 dated Sep. 2, 2011—7 pages.
Written Opinion issued in International Application No. PCT/US2008/052154 dated Oct. 14, 2008—18 pages.
Written Opinion issued in International Application No. PCT/US2008/079984 dated Dec. 19, 2008—5 pages.
Written Opinion issued in International Application No. PCT/US2010/046953 dated Oct. 25, 2010—11 pages.
Written Opinion issued in International Application No. PCT/US2010/046966 dated Oct. 15, 2010—19 pages.
Written Opinion issued in International Application No. PCT/US2011/029409 dated May 17, 2011—12 pages.
Written Opinion issued in International Application No. PCT/US2010/046967 dated Oct. 20, 2010—4 pages.
"Dew Point Control Gas Conditioning Units," SME Products Brochure, Gas Processors Assoc. Conference (Apr. 5, 2009)—2 pages.
"Fuel Gas Conditioning Units for Compressor Engines," SME Products Brochure, Gas Processors Assoc. Conference (Apr. 5, 2009)—2 pages.
"P&ID Fuel Gas Conditioner," Drawing No. SMEP-901, Date Drawn: Aug. 29, 2007, SME, available at http://www.sme-llc.com/sme.cfm?a=prd&catID=58&subID=44&prdID=155 (Apr. 24, 2009)—1 page.
"Fuel Gas Conditioner Preliminary Arrangement," Drawing No. SMP-1007-00, Date Drawn: Nov. 11, 2008, SME, available at http://www.sme-llc.com/sme.cfm?a=prd&catID=58&subID=44&prdID=155 (Apr. 24, 2009)—2 pages.
"Product: Fuel Gas Conditioning Units," SME Associates, LLC, available at http://www.smellc.com/sme.cfm?a=prd&catID=58&subID=44&prdID=155 (Apr. 24, 2009)—1 page.
Mowrey, E. Ross., "Efficient, High Recovery of Liquids from Natural Gas Utilizing a High Pressure Absorber," Proceedings of the Eighty-First Annual Convention of the Gas Processors Association, Dallas, Texas, Mar. 11-13, 2002—10 pages.
International Search Report and Written Opinion issued in International Application No. PCT/US2010/21364 dated Mar. 29, 2010—20 pages.
International Search Report and Written Opinion issued in International Application No. PCT/US2010/26185 dated Jul. 9, 2010—20 pages.
International Search Report and Written Opinion issued in International Application No. PCT/US2010/29331 dated Jul. 2, 2010—15 pages.
International Search Report and Written Opinion issued in International Application No. PCT/US2010/33374 dated Jul. 9, 2010—18 pages.
International Search Report and Written Opinion issued in corresponding International Application No. PCT/US2010/35121 dated Jul. 19, 2010—18 pages.
International Search Report and Written Opinion issued in International Application No. PCT/US2010/37098 dated Aug. 17, 2010—12 pages.
International Search Report and Written Opinion issued in International Application No. PCT/US2011/028872 dated May 18, 2011—6 pages.
International Search Report and Written Opinion issued in International Application No. PCT/US2011/29234 dated May 20, 2011—29 pages.
International Search Report and Written Opinion issued in International Application No. PCT/US2011/029034 dated Jul. 27, 2011—39 pages.
International Search Report and Written Opinion issued in International Application No. PCT/US2011/029409 dated May 17, 2011—14 pages.
International Search Report and Written Opinion issued in International Application No. PCT/US2011/029239 dated May 20, 2011—20 pages.

* cited by examiner

HYDROCABON GAS PROCESSING

This invention relates to a process and apparatus for the separation of a gas containing hydrocarbons and carbon dioxide. The applicants claim the benefits under Title 35, United States Code, Section 119(e) of prior U.S. Provisional Application No. 61/351,059 which was filed on Jun. 3, 2010.

BACKGROUND OF THE INVENTION

Hydrocarbons are found in a variety of gases, such as natural gas, refinery gas, and synthetic gas streams obtained from other hydrocarbon materials such as coal, crude oil, naphtha, oil shale, tar sands, and lignite. In many cases, the gas streams from these sources are contaminated with high concentrations of carbon dioxide, making the gas streams unsuitable for use as fuel, chemical plant feedstock, or other purposes. There are a variety of processes that have been developed to remove the carbon dioxide using chemical, physical, and hybrid solvents. Other processes have been developed that use a refrigerated absorbent stream composed of heavy ($C_4$-$C_{10}$ typically) hydrocarbons to remove the carbon dioxide in a distillation column, such as the process described in U.S. Pat. No. 4,318,723. All of these processes have increasingly higher capital cost and operating cost as the carbon dioxide concentration in the gas stream increases, which often makes processing of such gas streams uneconomical.

One method for improving the economics of processing gas streams containing high concentrations of carbon dioxide is to provide bulk separation of the carbon dioxide from the gas stream prior to processing with solvents or absorbents, so that only a minor fraction of the carbon dioxide must then be removed from the gas stream. For example, semi-permeable membranes have often been used for bulk removal of carbon dioxide. However, a significant fraction of the lighter hydrocarbons in the gas stream are often "lost" in the carbon dioxide stream that is separated by bulk removal processes of this type.

A better alternative for bulk removal of carbon dioxide is to use distillation to fractionate the gas stream into a light hydrocarbon stream and a carbon dioxide stream, so that removal of the residual carbon dioxide from the light hydrocarbon stream is all that is required to produce pipeline-quality gas for use as fuel, chemical plant feedstock, etc. The majority of the carbon dioxide that is removed is recovered as a liquid rather than a vapor, allowing the carbon dioxide to be pumped (rather than compressed) for subsequent use in tertiary oil recovery operations or for other purposes, resulting in substantial reductions in capital cost and operating cost.

The present invention is generally concerned with the removal of the majority of the carbon dioxide from such gas streams. A typical analysis of a gas stream to be processed in accordance with this invention would be, in approximate mole percent, 44.3% hydrogen, 13.0% carbon monoxide, 4.0% methane, and 38.5% carbon dioxide, with the balance made up of nitrogen and argon. Sulfur containing gases are also sometimes present.

In a typical distillation process for removing carbon dioxide, a feed gas stream under pressure is cooled by heat exchange with other streams of the process and/or external sources of refrigeration such as a propane compression-refrigeration system. The gas is condensed as it is cooled, and the high-pressure liquid is expanded to an intermediate pressure, resulting in further cooling of the stream due to the vaporization occurring during expansion of the liquids. The expanded stream, comprising a mixture of liquid and vapor, is fractionated in a distillation column to separate residual methane, nitrogen, and other volatile gases as overhead vapor from the carbon dioxide and the heavier hydrocarbon components as bottom liquid product. A portion of the liquid carbon dioxide can be flash expanded to lower pressure and thereafter used to provide low-level refrigeration to the process streams if desired.

The present invention employs a novel means of condensing the distillation column overhead vapor to increase the carbon dioxide removal efficiency. Instead of cooling the column overhead vapor to condense reflux for the fractionation column, the overhead vapor is compressed to higher pressure and then cooled to partially condense it. The resulting condensate is mostly liquid carbon dioxide, which can be flash expanded to intermediate pressure and used to provide mid-level refrigeration to the process streams before being returned to the distillation column at a mid-column feed point. In addition, the residue gas that remains after the condensate has been removed is suitable to be sent to treating without requiring further compression. Surprisingly, applicants have found that this novel process arrangement not only allows removing more of the carbon dioxide, but also reduces the power consumption required to achieve a given level of carbon dioxide removal, thereby increasing the process efficiency and reducing the operating cost of the facility.

In accordance with the present invention, it has been found that more than 75% of the carbon dioxide can be removed while leaving more than 99.8% of the methane and lighter components in the residue gas stream. The present invention, although applicable at lower pressures and warmer temperatures, is particularly advantageous when processing feed gases in the range of 400 to 1500 psia [2,758 to 10,342 kPa(a)] or higher under conditions requiring distillation column overhead temperatures of −50° F. [−46° C.] or colder.

For a better understanding of the present invention, reference is made to the following examples and drawings. Referring to the drawings.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE PRIOR ART

Figure 1:
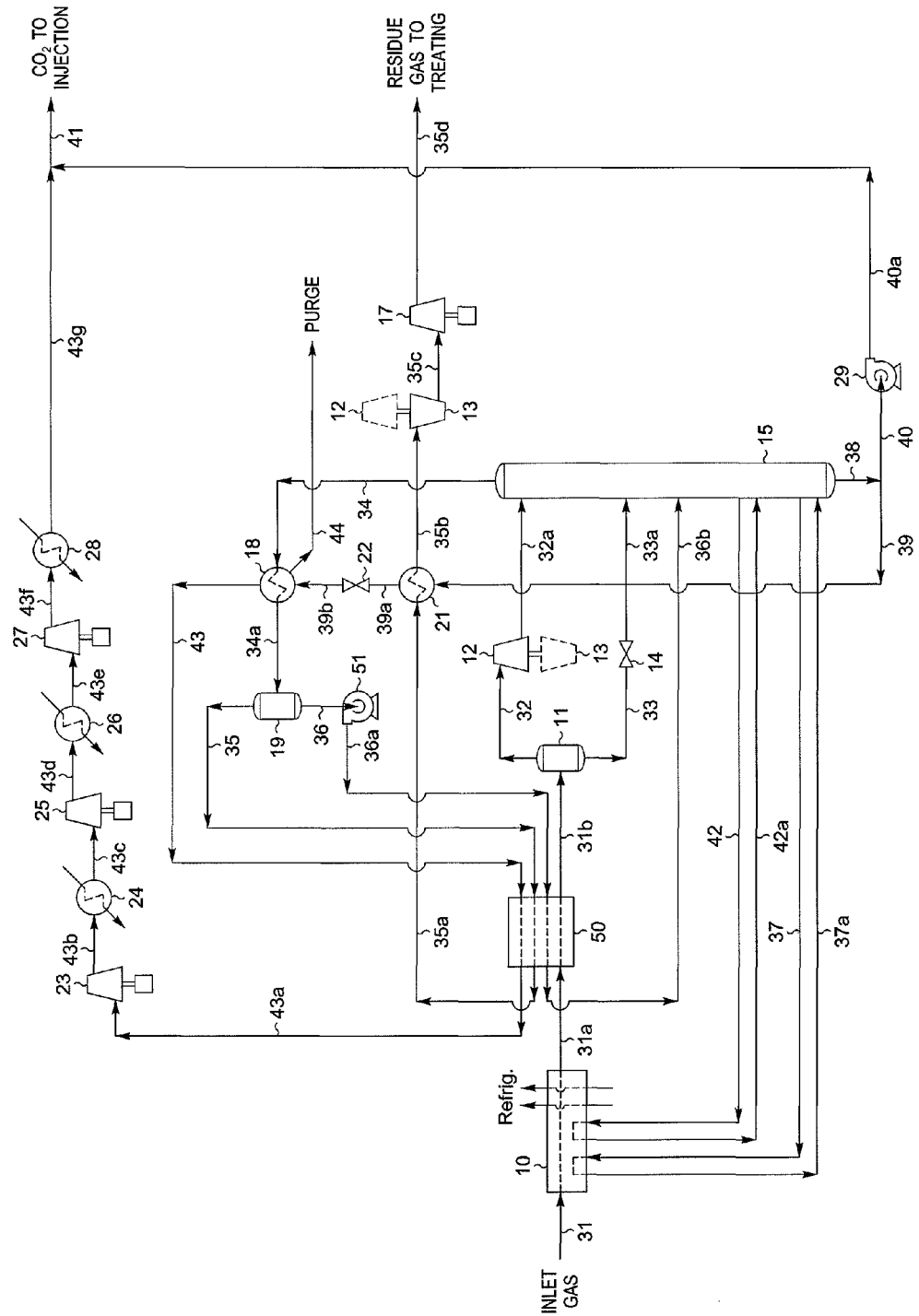
FIG. 1 is a flow diagram of a prior art synthesis gas processing plant.

FIG. 1 is a process flow diagram showing the design of a processing plant to remove carbon dioxide from synthesis gas using a prior art process. In this simulation of the process, inlet gas enters the plant at 120° F. [49° C.] and 1080 psia [7,446 kPa(a)] as stream 31. The feed stream is usually dehydrated to prevent hydrate (ice) formation under cryogenic conditions. Solid and liquid desiccants have both been used for this purpose.

The feed stream 31 is cooled to −20° F. [−29° C.] in heat exchanger 10 by heat exchange with column reboiler liquids at 49° F. [9° C.] (stream 37), column side reboiler liquids at 34° F. [1° C.] (stream 42), and propane refrigerant. Stream 31a is further cooled in heat exchanger 50 by heat exchange with cool carbon dioxide vapor at −56° F. [−49° C.] (stream 43), cold residue gas at −60° F. [−51° C.] (stream 35), and pumped liquid at −60° F. [−51° C.] (stream 36a). The further cooled stream 31b enters separator 11 at −27° F. [−33° C.] and 1049 psia [7,233 kPa(a)] where the vapor (stream 32) is separated from the condensed liquid (stream 33).

The vapor from separator 11 (stream 32) enters a work expansion machine 12 in which mechanical energy is extracted from this portion of the high pressure feed. The machine 12 expands the vapor substantially isentropically to the operating pressure (approximately 665 psia [4,583 kPa(a)]) of fractionation tower 15, with the work expansion cooling the expanded stream 32a to a temperature of approximately −48° F. [−45° C.]. The typical commercially available expanders are capable of recovering on the order of 80-88% of the work theoretically available in an ideal isentropic expansion. The work recovered is often used to drive a centrifugal compressor (such as item 13) that can be used to re-compress the residue gas (stream 35b), for example. The partially condensed expanded stream 32a is thereafter supplied to fractionation tower 15 at its top column feed point. The separator liquid (stream 33) is expanded to the operating pressure of fractionation tower 15 by expansion valve 14, cooling stream 33a to −28° F. [−33° C.] before it is supplied to fractionation tower 15 at an upper mid-column feed point.

Overhead vapor stream 34 leaves fractionation tower 15 at −48° F. [−45° C.] and is cooled and partially condensed in heat exchanger 18. The partially condensed stream 34a enters separator 19 at −60° F. [−51° C.] and 658 psia [4,535 kPa(a)] where the vapor (cold residue gas stream 35) is separated from the condensed liquid (stream 36). Liquid stream 36 is pumped to slightly above the operating pressure of fractionation tower 15 by pump 51 before stream 36a enters heat exchanger 50 and is heated to −26° F. [−32° C.] by heat exchange with the feed gas as described previously. The heated stream 36b is, thereafter supplied as feed to fractionation tower 15 at a lower mid-column feed point.

Fractionation tower 15 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product (stream 38) of methane and lighter components. The trays and/or packing provide the necessary contact between the stripping vapors rising upward and cold liquid falling downward, so that the bottom product stream 38 exits the bottom of the tower at 50° F. [10° C.], based on reducing the methane concentration in the bottom product to 0.47% on a molar basis.

Column bottom product stream 38 is predominantly liquid carbon dioxide. A small portion (stream 39) is subcooled in heat exchanger 21 by cool residue gas stream 35a. The subcooled liquid (stream 39a) at −20° F. [−29° C.] is expanded to lower pressure by expansion valve 22 and partially vaporized, further cooling stream 39b to −65° F. [−54° C.] before it enters heat exchanger 18. The residual liquid in stream 39b functions as refrigerant in heat exchanger 18 to provide cooling of stream 34 as described previously, with the resulting carbon dioxide vapor leaving at −56° F. [−49° C.] as stream 43. Since stream 39b could contain small amounts of heavier hydrocarbons, a small liquid purge (stream 44) may be drawn off from heat exchanger 18 to prevent an accumulation of heavier hydrocarbons in the refrigerant liquid that could elevate its boiling point and reduce the cooling efficiency of heat exchanger 18.

The cool carbon dioxide vapor from heat exchanger 18 (stream 43) is heated to −28° F. [−33° C.] in heat exchanger 50 by heat exchange with the feed gas as described previously. The warm carbon dioxide vapor (stream 43a) at 74 psia [508 kPa(a)] is then compressed to high pressure in three stages by compressors 23, 25, and 27, with cooling to 120° F. [49° C.] after each stage of compression by discharge coolers 24, 26, and 28. The remaining portion (stream 40) of column bottom product stream 38 is pumped to high pressure by pump 29 so that stream 40a can combine with the high pressure gas (stream 43g) leaving discharge cooler 28, forming high pressure carbon dioxide stream 41 which then flows to reinjection at 82° F. [28° C.] and 1115 psia [7,688 kPa(a)].

The cool residue gas (stream 35a) leaves heat exchanger 50 at −28° F. [−33° C.] after heat exchange with the feed gas as described previously, and is further heated to −8° F. [−22° C.] in heat exchanger 21 by heat exchange with liquid carbon dioxide stream 39 as described previously. The warm residue gas stream 35b is then re-compressed in two stages, compressor 13 driven by expansion machine 12 and compressor 17 driven by a supplemental power source. Residue gas stream 35d then flows to treating at 90° F. [32° C.] and 1115 psia [7,688 kPa(a)].

A summary of stream flow rates and energy consumption for the process illustrated in FIG. 1 is set forth in the following table:

TABLE I (FIG. 1)
Stream Flow Summary-Lb. Moles/Hr [kg moles/Hr]

| Stream | Hydrogen | C. Monoxide | Methane | C. Dioxide | Total |
|---|---|---|---|---|---|
| 31 | 22,177 | 6,499 | 2,014 | 19,288 | 50,115 |
| 32 | 21,992 | 6,311 | 1,901 | 10,700 | 41,036 |
| 33 | 185 | 188 | 113 | 8,588 | 9,079 |
| 34 | 22,201 | 6,535 | 1,981 | 9,654 | 40,509 |
| 36 | 24 | 36 | 24 | 2,536 | 2,622 |

TABLE I-continued (FIG. 1)
Stream Flow Summary-Lb. Moles/Hr [kg moles/Hr]

| | | | | | |
|---|---|---|---|---|---|
| 38 | 0 | 0 | 57 | 12,170 | 12,228 |
| 39 | 0 | 0 | 15 | 3,235 | 3,250 |
| 43 | 0 | 0 | 15 | 3,235 | 3,250 |
| 44 | 0 | 0 | 0 | 0 | 0 |
| 40 | 0 | 0 | 42 | 8,935 | 8,978 |
| 35 | 22,177 | 6,499 | 1,957 | 7,118 | 37,887 |
| 41 | 0 | 0 | 57 | 12,170 | 12,228 |

Recovery/Removal*

| | | |
|---|---|---|
| Methane and Lighter | 99.34% | (recovered in the Residue Gas) |
| Carbon Dioxide | 63.10% | (removed from the Residue Gas) |

Carbon Dioxide Concentrations*

| | |
|---|---|
| Residue Gas | 18.79% |
| Carbon Dioxide Product | 99.50% |

Power

| | | |
|---|---|---|
| Carbon Dioxide Compression | 4,955 HP | [8,146 kW] |
| Residue Gas Compression | 5,717 HP | [9,398 kW] |
| Refrigerant Compression | 14,960 HP | [24,594 kW] |
| Carbon Dioxide Pump | 324 HP | [533 kW] |
| Totals | 25,956 HP | [42,671 kW] |

*(Based on un-rounded flow rates)

DESCRIPTION OF THE INVENTION

Figure 2:
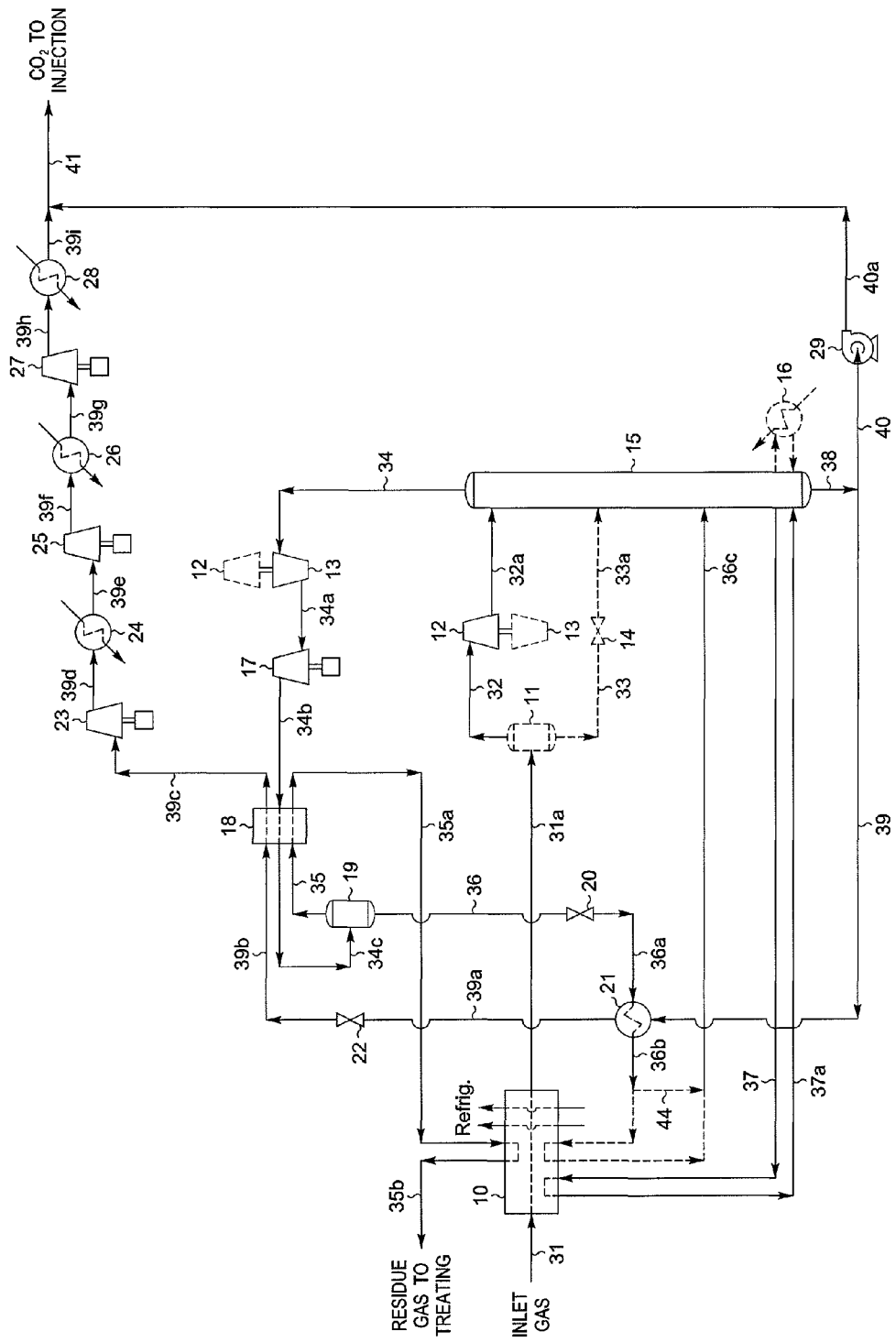
FIG. 2 is a flow diagram of a synthesis gas processing plant in accordance with the present invention.

FIG. 2 illustrates a flow diagram of a process in accordance with the present invention. The feed gas composition and conditions considered in the process presented in FIG. 2 are the same as those in FIG. 1. Accordingly, the FIG. 2 process can be compared with that of the FIG. 1 process to illustrate the advantages of the present invention.

In the simulation of the FIG. 2 process, inlet gas enters the plant at 120° F. [49° C.] and 1080 psia [7,446 kPa(a)] as stream 31 and is cooled in heat exchanger 10 by heat exchange with column reboiler liquids at 47° F. [8° C.] (stream 37), residue gas at 30° F. [−1° C.] (stream 35a), cool expanded liquids at 20° F. [−7° C.] (stream 36b), and propane refrigerant. The cooled stream 31a enters separator 11 at −30° F. [−34° C.] and 1049 psia [7,233 kPa(a)] where the vapor (stream 32) is separated from the condensed liquid (stream 33).

The vapor from separator 11 (stream 32) enters a work expansion machine 12 in which mechanical energy is extracted from this portion of the high pressure feed. The machine 12 expands the vapor substantially isentropically to the operating pressure (approximately 640 psia [4,413 kPa(a)]) of fractionation tower 15, with the work expansion cooling the expanded stream 32a to a temperature of approximately −54° F. [−48° C.]. The partially condensed expanded stream 32a is thereafter supplied to fractionation tower 15 at its top column feed point. The separator liquid (stream 33) is expanded to the operating pressure of fractionation tower 15 by expansion valve 14, cooling stream 33a to −30° F. [−35° C.] before it is supplied to fractionation tower 15 at an upper mid-column feed point.

Overhead vapor stream 34 leaves fractionation tower 15 at −52° F. [−47° C.] and is compressed in two stages, compressor 13 driven by expansion machine 12 and compressor 17 driven by a supplemental power source. The compressed stream 34b is then cooled and partially condensed in heat exchanger 18. The partially condensed stream 34c enters separator 19 at −60° F. [−51° C.] and 1130 psia [7,791 kPa(a)] where the vapor (cold residue gas stream 35) is separated from the condensed liquid (stream 36). Liquid stream 36 is expanded to slightly above the operating pressure of fractionation tower 15 by expansion valve 20 before stream 36a enters heat exchanger 21. The expanded stream 36a is heated from −59° F. [−51° C.] to 20° F. [−7° C.] and partially vaporized by heat exchange with liquid carbon dioxide stream 39 (which is described further below in paragraph [0028]). The partially vaporized stream 36b is further vaporized in heat exchanger 10 by heat exchange with the feed gas as described previously, and stream 36c at 38° F. [3° C.] is thereafter supplied as feed to fractionation tower 15 at a lower mid-column feed point.

Fractionation tower 15 is a conventional distillation column containing a plurality of vertically spaced trays, one or more packed beds, or some combination of trays and packing. It also includes reboilers (such as the reboiler described previously, and optionally a reboiler 16 heated by an external source of heat) which heat and vaporize a portion of the liquids flowing down the column to provide the stripping vapors which flow up the column to strip the column bottom liquid product (stream 38) of methane and lighter components. The trays and/or packing provide the necessary contact between the stripping vapors rising upward and cold liquid falling downward, so that the bottom product stream 38 exits the bottom of the tower at 48° F. [9° C.], based on reducing the methane concentration in the bottom product to 0.30% on a molar basis.

Column bottom product stream 38 is predominantly liquid carbon dioxide. A minor portion (stream 39) is subcooled in heat exchanger 21 by flash expanded liquid stream 36a as described previously. The subcooled liquid (stream 39a) at −33° F. [−36° C.] is expanded to lower pressure by expansion valve 22 and partially vaporized, further cooling stream 39b to −65° F. [−54° C.] before it enters heat exchanger 18. The residual liquid in stream 39b functions as refrigerant in heat exchanger 18 to provide a portion of the cooling of compressed overhead vapor stream 34b as described previously, with the resulting carbon dioxide vapor leaving at 22° F. [−6° C.] (stream 39c).

The warm carbon dioxide vapor (stream 39c) at 78 psia [536 kPa(a)] is then compressed to high pressure in three stages by compressors 23, 25, and 27, with cooling to 120° F. [49° C.] after each stage of compression by discharge coolers 24, 26, and 28. The remaining portion (stream 40) of column bottom product stream 38 is pumped to high pressure by pump 29 so that stream 40a can combine with the high pressure gas (stream 39i) leaving discharge cooler 28, forming high pressure carbon dioxide stream 41 which then flows to reinjection at 84° F. [29° C.] and 1115 psia [7,688 kPa(a)].

The cold residue gas (stream 35) from separator 19 enters heat exchanger 18 and is heated to 30° F. [−1° C.] by heat exchange with compressed overhead vapor stream 34b as described previously. Cool residue gas stream 35a is further heated to 72° F. [22° C.] in heat exchanger 10 by heat exchange with the feed gas as described previously. The warm residue gas stream 35b then flows to treating at 1115 psia [7,688 kPa(a)].

A summary of stream flow rates and energy consumption for the process illustrated in FIG. 2 is set forth in the following table:

of carbon dioxide removed for the prior art to 1.96 HP-H/Lb·mole [3.22 kW-H/kg mole] for the present invention.

The improvement in energy efficiency provided by the present invention over that of the prior art of the FIG. 1 process is primarily due to two factors. First, compressing overhead vapor stream 34 from fractionation tower 15 to higher pressure before supplying it to heat exchanger 18 makes it much easier to condense carbon dioxide from the stream. As can be seen by comparing stream 36 in Tables I and II, the carbon dioxide condensed in stream 36 increases from 2,536 Lb. Moles/Hr [2,536 kg moles/Hr] for the prior art to 4,257 Lb. Moles/Hr [4,257 kg moles/Hr] for the present invention. The result is that the residue gas that remains (stream 35) contains much less carbon dioxide, 4,795 Lb. Moles/Hr [4,795 kg moles/Hr] for the present invention versus 7,118 Lb. Moles/Hr [7,118 kg moles/Hr] for the prior art.

Second, the greater quantity of liquid condensed in stream 36 for the present invention provides a process stream that can be used more effectively for mid-level refrigeration within the process. The resulting flashed stream 36a has 72% more flow than pumped stream 36a in the prior art process, allowing it to

TABLE II (FIG. 2)
Stream Flow Summary-Lb. Moles/Hr [kg moles/Hr]

| Stream | Hydrogen | C. Monoxide | Methane | C. Dioxide | Total |
|---|---|---|---|---|---|
| 31 | 22,177 | 6,499 | 2,014 | 19,288 | 50,115 |
| 32 | 21,984 | 6,297 | 1,892 | 10,038 | 40,343 |
| 33 | 193 | 202 | 122 | 9,250 | 9,772 |
| 34 | 22,256 | 6,607 | 2,041 | 9,052 | 40,092 |
| 36 | 79 | 109 | 71 | 4,257 | 4,517 |
| 38 | 0 | 1 | 44 | 14,493 | 14,540 |
| 39 | 0 | 0 | 14 | 4,493 | 4,507 |
| 40 | 0 | 1 | 30 | 10,000 | 10,033 |
| 35 | 22,177 | 6,498 | 1,970 | 4,795 | 35,575 |
| 41 | 0 | 1 | 44 | 14,493 | 14,540 |

Recovery/Removal*

| | | |
|---|---|---|
| Methane and Lighter | 99.85% | (recovered in the Residue Gas) |
| Carbon Dioxide | 75.15% | (removed from the Residue Gas) |

Carbon Dioxide Concentrations*

| | |
|---|---|
| Residue Gas | 13.47% |
| Carbon Dioxide Product | 99.69% |

Power

| | | |
|---|---|---|
| Carbon Dioxide Compression | 6,742 HP | [11,084 kW] |
| Overhead Vapor Compression | 5,095 HP | [8,376 kW] |
| Refrigerant Compression | 16,184 HP | [26,606 kW] |
| Carbon Dioxide Pump | 378 HP | [621 kW] |
| Totals | 28,399 HP | [46,687 kW] |

*(Based on un-rounded flow rates)

A comparison of Tables I and II shows that, compared to the prior art, the present invention provides better methane recovery (99.85%, versus 99.44% for the prior art), much better carbon dioxide removal (75.15%, versus 63.10% for the prior art), much lower carbon dioxide concentration in the residue gas (13.47%, versus 18.79% for the prior art), and better carbon dioxide purity (99.69%, versus 99.50% for the prior art). In addition, further comparison of Tables I and II shows that this superior process performance was achieved using less power per unit of carbon dioxide removed than the prior art. In terms of the specific power consumption, the present invention represents an 8% improvement over the prior art of the FIG. 1 process, reducing the specific power consumption from 2.13 HP-H/Lb·mole [3.51 kW-H/kg mole]

subcool a larger quantity of liquid carbon dioxide in stream 39 (39% more than the prior art) to a lower temperature (−33° F. [−36° C.], versus −20° F. [−29° C.] for the prior art), so that the resulting flashed carbon dioxide stream 39b for the present invention contains a much larger quantity of liquid that can be used as refrigerant to condense carbon dioxide from overhead vapor stream 34 in heat exchanger 18.

The net result of these two factors is to capture significantly more of the carbon dioxide in column bottom product stream 38 (19% more compared to the FIG. 1 prior art process) at greater efficiency using less specific power. This also means that much less of the carbon dioxide remains in residue gas stream 35, greatly reducing (or perhaps eliminating entirely) the downstream treating needed to condition the residue gas for subsequent processing or use, further reducing the total treating cost for a given application.

Other Embodiments

As described earlier for the embodiment of the present invention shown in FIG. 2, feed stream 31 is partially condensed as it is cooled in heat exchanger 10, and the resulting vapor stream 32 and liquid stream 33 are then expanded to the operating pressure of fractionation column 15. However, the present invention is not limited to this embodiment. Depending on the quantity of heavier hydrocarbons in the feed gas and the feed gas pressure, the cooled feed stream 31a may not contain any liquid (because it is above its dewpoint, or because it is above its cricondenbar). In such cases, separator 11 is not required. Some circumstances may favor total condensation of the feed gas, followed by expanding the liquid or dense phase fluid to the operating pressure of fractionation column 15. Such cases may likewise not require separator 11.

Feed gas conditions, plant size, available equipment, or other factors may indicate that elimination of work expansion machine 12, or replacement with an alternate expansion device (such as an expansion valve), is feasible. Although individual stream expansion is depicted in particular expansion devices, alternative expansion means may be employed where appropriate. For example, conditions may warrant work expansion of liquid streams 33, 36, and/or 39a.

In accordance with the present invention, the use of external refrigeration to supplement the cooling available to the inlet gas and/or compressed overhead vapor stream 34b from other process streams may be employed, particularly in the case of a rich inlet gas. The use and distribution of separator liquids and/or demethanizer side draw liquids for process heat exchange, and the particular arrangement of heat exchangers for inlet gas cooling must be evaluated for each particular application, as well as the choice of process streams for specific heat exchange services. For instance, some circumstances may favor supplying partially vaporized stream 36b directly to fractionation tower 15 (via stream 44 in FIG. 2) rather than further vaporizing it in heat exchanger 10 and then supplying the resulting stream 36c to fractionation tower 15.

Depending on the temperature and richness of the feed gas and the amount of methane allowed in liquid product stream 38, there may not be sufficient heating available from feed stream 31 to cause the liquid leaving fractionation column 15 to meet the product specifications. In such cases, the fractionation column 15 may include one or more reboilers (such as reboiler 16) heated by an external source of heat.

In some circumstances, the portion (stream 39) of column bottom product stream 38 that is used to provide refrigeration may not need to be restored to high pressure after it has been heated (stream 39c). In such cases, the compression and cooling shown (compressors 23, 25, and 27 and discharge coolers 24, 26, and 28) may not be needed, and only stream 40a flows to stream 41.

The present invention provides improved separation of carbon dioxide from hydrocarbon gas streams per amount of utility consumption required to operate the process. An improvement in utility consumption required for operating the process may appear in the form of reduced power requirements for compression or re-compression, reduced power requirements for pumping, reduced power requirements for external refrigeration, reduced energy requirements for tower reboiling, or a combination thereof.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of a gas stream containing at least methane and carbon dioxide into a volatile residue gas fraction containing a major portion of said methane and a relatively less volatile fraction containing a major portion of said carbon dioxide wherein
    (1) said gas stream is cooled, thereby forming a cooled stream;
    (2) said cooled stream is expanded to intermediate pressure whereby it is further cooled;
    (3) said expanded cooled stream is supplied as a top feed to a distillation column and fractionated at said intermediate pressure into an overhead vapor stream and said relatively less volatile fraction;
    (4) said overhead vapor stream is compressed to higher pressure;
    (5) said compressed overhead vapor stream is cooled sufficiently to condense at least a part of it, thereby forming a residual vapor stream and a condensed stream;
    (6) said condensed stream is expanded to said intermediate pressure and heated, and thereafter supplied to said distillation column at a mid-column feed position;
    (7) said relatively less volatile fraction is divided into at least first and second streams;
    (8) said second stream is cooled, thereby to supply at least a portion of the heating of step (6);
    (9) said cooled second stream is expanded to lower pressure whereby it is further cooled;
    (10) said expanded cooled second stream is heated, thereby to supply at least a portion of the cooling of step (5);
    (11) said residual vapor stream is heated, thereby to supply at least a portion of the cooling of steps (1) and (5), and thereafter discharging said heated residual vapor stream as said volatile residue gas fraction; and
    (12) the quantities and temperatures of said feed streams to said distillation column are effective to maintain the overhead temperature of said distillation column at a temperature whereby the major portion of said carbon dioxide is recovered in said relatively less volatile fraction.

2. A process for the separation of a gas stream containing at least methane and carbon dioxide into a volatile residue gas fraction containing a major portion of said methane and a relatively less volatile fraction containing a major portion of said carbon dioxide wherein
    (1) said gas stream is cooled sufficiently to partially condense it;
    (2) said partially condensed gas stream is separated, thereby to provide a vapor stream and at least one liquid stream;
    (3) said vapor stream is expanded to intermediate pressure;
    (4) said expanded vapor stream is supplied as a top feed to a distillation column and fractionated at said intermediate pressure into an overhead vapor stream and said relatively less volatile fraction;
    (5) said at least one liquid stream is expanded to said intermediate pressure, and thereafter supplied to said distillation column at an upper mid-column feed position;
    (6) said overhead vapor stream is compressed to higher pressure;

(7) said compressed overhead vapor stream is cooled sufficiently to condense at least a part of it, thereby forming a residual vapor stream and a condensed stream;

(8) said condensed stream is expanded to said intermediate pressure and heated, and thereafter supplied to said distillation column at a lower mid-column feed position below said upper mid-column feed position;

(9) said relatively less volatile fraction is divided into at least first and second streams;

(10) said second stream is cooled, thereby to supply at least a portion of the heating of step (8);

(11) said cooled second stream is expanded to lower pressure whereby it is further cooled;

(12) said expanded cooled second stream is heated, thereby to supply at least a portion of the cooling of step (7);

(13) said residual vapor stream is heated, thereby to supply at least a portion of the cooling of steps (1) and (7), and thereafter discharging said heated residual vapor stream as said volatile residue gas fraction; and

(14) the quantities and temperatures of said feed streams to said distillation column are effective to maintain the overhead temperature of said distillation column at a temperature whereby the major portion of said carbon dioxide is recovered in said relatively less volatile fraction.

3. An apparatus for the separation of a gas stream containing at least methane and carbon dioxide into a volatile residue gas fraction containing a major portion of said methane and a relatively less volatile fraction containing a major portion of said carbon dioxide comprising (1) first heat exchange means to cool said gas stream, thereby forming a cooled stream;

(2) first expansion means connected to said first heat exchange means to receive said cooled stream and expand it to intermediate pressure;

(3) distillation column connected to said first expansion means to receive said expanded cooled stream as a top feed thereto, said distillation column being adapted to fractionate said expanded cooled stream at said intermediate pressure into an overhead vapor stream and said relatively less volatile fraction;

(4) compressing means connected to said distillation column to receive said overhead vapor stream and compress it to higher pressure;

(5) second heat exchange means connected to said compressing means to receive said compressed overhead vapor stream and cool it sufficiently to condense at least a part of it;

(6) separating means connected to said second heat exchange means to receive said partially condensed compressed overhead vapor stream and separate it, thereby forming a residual vapor stream and a condensed stream;

(7) second expansion means connected to said separating means to receive said condensed stream and expand it to said intermediate pressure;

(8) third heat exchange means connected to said second expansion means to receive said expanded condensed stream and heat it, said third heat exchange means being further connected to said distillation column to supply said heated expanded condensed stream to said distillation column at a mid-column feed position;

(9) dividing means connected to said distillation column to receive said relatively less volatile fraction and divide it into at least first and second streams;

(10) said third heat exchange means being further connected to said dividing means to receive said second stream and cool it, thereby to supply at least a portion of the heating of element (8);

(11) third expansion means connected to said third heat exchange means to receive said cooled second stream and expand it to lower pressure;

(12) said second heat exchange means being further connected to said third expansion means to receive said expanded cooled second stream and heat it, thereby to supply at least a portion of the cooling of element (5);

(13) said second heat exchange means being further connected to said separating means to receive said residual vapor stream and heat it, thereby to supply at least a portion of the cooling of element (5);

(14) said first heat exchange means being further connected to said second heat exchange means to receive said heated residual vapor stream and further heat it, thereby to supply at least a portion of the cooling of element (1), and thereafter discharging said further heated residual vapor stream as said volatile residue gas fraction; and

(15) control means adapted to regulate the quantities and temperatures of said feed streams to said distillation column to maintain the overhead temperature of said distillation column at a temperature whereby the major portion of said carbon dioxide is recovered in said relatively less volatile fraction.

4. An apparatus for the separation of a gas stream containing at least methane and carbon dioxide into a volatile residue gas fraction containing a major portion of said methane and a relatively less volatile fraction containing a major portion of said carbon dioxide comprising (1) first heat exchange means to cool said gas stream sufficiently to partially condense it, thereby forming a partially condensed gas stream;

(2) first separating means connected to said first heat exchange means to receive said partially condensed gas stream and separate it into a vapor stream and at least one liquid stream;

(3) first expansion means connected to said first separating means to receive said vapor stream and expand it to intermediate pressure;

(4) distillation column connected to said first expansion means to receive said expanded vapor stream as a top feed thereto, said distillation column being adapted to fractionate said expanded vapor stream at said intermediate pressure into an overhead vapor stream and said relatively less volatile fraction;

(5) second expansion means connected to said first separating means to receive said at least one liquid stream and expand it to said intermediate pressure, said second expansion means being further connected to said distillation column to supply said expanded at least one liquid stream to said distillation column at an upper mid-column feed position;

(6) compressing means connected to said distillation column to receive said overhead vapor stream and compress it to higher pressure;

(7) second heat exchange means connected to said compressing means to receive said compressed overhead vapor stream and cool it sufficiently to condense at least a part of it;

(8) second separating means connected to said second heat exchange means to receive said partially condensed compressed overhead vapor stream and separate it, thereby forming a residual vapor stream and a condensed stream;

(9) third expansion means connected to said second separating means to receive said condensed stream and expand it to said intermediate pressure;

(10) third heat exchange means connected to said third expansion means to receive said expanded condensed stream and heat it, said third heat exchange means being further connected to said distillation column to supply said heated expanded condensed stream to said distillation column at a lower mid-column feed position below said upper mid-column feed position;

(11) dividing means connected to said distillation column to receive said relatively less volatile fraction and divide it into at least first and second streams;

(12) said third heat exchange means being further connected to said dividing means to receive said second stream and cool it, thereby to supply at least a portion of the heating of element (10);

(13) fourth expansion means connected to said third heat exchange means to receive said cooled second stream and expand it to lower pressure;

(14) said second heat exchange means being further connected to said fourth expansion means to receive said expanded cooled second stream and heat it, thereby to supply at least a portion of the cooling of element (7);

(15) said second heat exchange means being further connected to said second separating means to receive said residual vapor stream and heat it, thereby to supply at least a portion of the cooling of element (7);

(16) said first heat exchange means being further connected to said second heat exchange means to receive said heated residual vapor stream and further heat it, thereby to supply at least a portion of the cooling of element (1), and thereafter discharging said further heated residual vapor stream as said volatile residue gas fraction; and

(17) control means adapted to regulate the quantities and temperatures of said feed streams to said distillation column to maintain the overhead temperature of said distillation column at a temperature whereby the major portion of said carbon dioxide is recovered in said relatively less volatile fraction.

5. The apparatus according to claim 3 wherein said first heat exchange means is further connected to said third heat exchange means to receive said heated expanded condensed stream and further heat it, thereby to supply at least a portion of the cooling of element (1), said first heat exchange means being further connected to said distillation column to supply said further heated expanded condensed stream to said distillation column at said mid-column feed position.

6. The apparatus according to claim 4 wherein said first heat exchange means is further connected to said third heat exchange means to receive said heated expanded condensed stream and further heat it, thereby to supply at least a portion of the cooling of element (1), said first heat exchange means being further connected to said distillation column to supply said further heated expanded condensed stream to said distillation column at said lower mid-column feed position.

* * * * *

UNITED STATES PATENT AND TRADEMARK OFFICE
CERTIFICATE OF CORRECTION

PATENT NO. : 8,667,812 B2  
APPLICATION NO. : 13/117242  
DATED : March 11, 2014  
INVENTOR(S) : Kyle T. Cuellar Page 1 of 1

It is certified that error appears in the above-identified patent and that said Letters Patent is hereby corrected as shown below:

ON THE TITLE PAGE [54] AND IN THE SPECIFICATION, COLUMN 1, LINE 1:

Title, "HYDROCABON GAS PROCESSING" should read
--HYDROCARBON GAS PROCESSING--.

ON THE TITLE PAGE [73]:

Assignee, "Ordoff Engineers, Ltd., Midland, TX (US)" should read
--Ortloff Engineers, Ltd., Midland, TX (US)--.

IN THE SPECIFICATION:

COLUMN 7:

Line 67, "Lb•mole" should read --Lb.mole--.

COLUMN 8:

Line 2, "Lb•mole" should read --Lb.mole--.

Signed and Sealed this
Tenth Day of June, 2014

Michelle K. Lee
*Deputy Director of the United States Patent and Trademark Office*